US005513600A

United States Patent [19]
Teves

[11] Patent Number: 5,513,600
[45] Date of Patent: May 7, 1996

[54] WATER FUEL CONVERTER FOR AUTOMOTIVE AND OTHER ENGINES

[76] Inventor: Antonio Y. Teves, 2456 W. Level Ave., Anaheim, Calif. 92804

[21] Appl. No.: 290,598

[22] Filed: Aug. 15, 1994

Related U.S. Application Data

[63] Continuation-in-part of Ser. No. 406,052, Sep. 11, 1989, abandoned, and a continuation-in-part of Ser. No. 627,751, Dec. 14, 1990, abandoned.

[51] Int. Cl.$^6$ .................................................. F02B 43/08
[52] U.S. Cl. ................. 123/3; 123/DIG. 12; 204/DIG. 4
[58] Field of Search ................................. 123/3, DIG. 12; 204/DIG. 4, 129

[56] References Cited

U.S. PATENT DOCUMENTS

| | | | |
|---|---|---|---|
| 3,648,668 | 3/1972 | Pacheco | 123/DIG. 12 |
| 4,099,489 | 7/1978 | Bradley | 123/DIG. 12 |
| 4,271,793 | 6/1981 | Valdespino | 123/DIG. 12 |
| 4,369,737 | 1/1983 | Sanders | 123/DIG. 12 |
| 4,763,610 | 8/1988 | Thomas | 123/DIG. 12 |
| 4,773,981 | 9/1988 | Bidwell | 123/3 |
| 5,105,773 | 4/1992 | Cunningham et al. | 123/DIG. 12 |
| 5,119,768 | 6/1992 | Russell | 123/DIG. 12 |
| 5,143,025 | 9/1992 | Monday | 123/DIG. 12 |
| 5,156,114 | 10/1992 | Gunnerman | 123/DIG. 12 |
| 5,231,954 | 8/1993 | Stowe | 123/DIG. 12 |

*Primary Examiner*—Erick R. Solis
*Attorney, Agent, or Firm*—Barry A. Bisson

[57] ABSTRACT

Device and method of generating hydrogen from water and utilizing simultaneously the generated hydrogen gas as alternative fuel or supplemental for automotive and other engines as means to replace up to at least as much as 80% of the hydro-carbon fuels used by such engines. The hydrogen generating device comprises an electrolytic cell or combination of two or more cells energized by a high density direct current of as much as 5,000 amperes, such electrical energy derived from the automotive engine by transforming mechanical energy to electrical energy by means of a direct current generator. The electrolytic cell or cells is supplied by a continuous feed water supply system. Increased capacities are possible due to high amperage loads attainable by the electrolytic cell without overheating. This is necessary to produce the requisite amount of hydrogen gas fuel capable of operating automotive and other engines, for example, with a fuel mixture of hydrogen and only 20% by volume of the gasoline fuel usually used in the engine, after a steady state condition is achieved. The electrolytic cell or cells are equipped with means to control energy load, water flow, gas flow, gas pressure, and presenting the hydrogen gas fuel into the combustion chambers of the automotive and other engines.

4 Claims, 6 Drawing Sheets

WATER FUEL CONVERTER FOR AUTOMOTIVE AND OTHER ENGINES

This application is a continuation-in-part of the application of ANTONIO Y. TEVES, Ser. Nos. 7/406,052 and 07/627,751, filed Sep. 11, 1989, and Dec. 14, 1990, both abandoned.

In this application, unless otherwise specified, percentages are liquid volume percent.

BACKGROUND OF THE INVENTION

1. Field of the Invention

This invention relates to an efficient water fuel converter which converts water into hydrogen and oxygen whereby the generated hydrogen gas is utilized simultaneously as an alternative fuel to replace up to at least 80% of the hydrocarbon fuels or other synthetic fuels with the hydrogen fuels used by automotive and other engines. For example, the fuel generated from the system can replace up to 80% of the volume of gasoline admixture normally used in an automobile engine. Recycle of the oxygen to the combustion chamber can reduce undesirable combustion byproducts, such as nitrogen oxide.

2. Description of the Prior Art

Several patents pertaining to utilization of hydrogen gas as a source of fuel for automotive and other engines were not well-appreciated by vehicle owners because of several drawbacks, disadvantages, and inherent defects in the system. Some were very cumbersome, utilizing the ready-made hydrogen contained in heavy steel cylinders (U.S. Pat. Nos. 4,508,084; 3,983,882; 4,178,882), while others dealt with generation of hydrogen on a very limited scale insufficient to replace a majority (and even at least about 80%) of the total volume of fuel requirements of automotive and other engines. Other patents (U.S. Pat. Nos. 4,597,363; 4,368,696; 4,489,864; 3,458,412; 3,242,665; 4,203,814), generate very limited quantities of hydrogen from chemicals and other sources insufficient to supply a majority to at least about 80% of the total fuel needs of automotive engines. Still another invention (U.S. Pat. No. 4,036,181) describes the use of metal hydrides, particularly magnesium hydride, in generating hydrogen gas as fuel for automotive engines. However, the drawbacks of this invention are: 1) the metal hydride is expensive; 2) the process of generating hydrogen is complicated and involves costly equipment; and 3) the method of refueling is inconvenient and time-consuming. Further, the process of regenerating the spent hydride involves costly and complex operations.

Another invention (U.S. Pat. No. 4,763,610) relates to a gas generator which generates hydrogen from a 30% solution of sodium hydroxide (30% NaOH). The generated hydrogen is not utilized directly, but is subsequently mixed with the petroleum-based fuel in an engine component before it can run an engine. This method has several drawbacks, among which are the following: 1) the gas generating device has a limited capacity because it can only generate a small amount of hydrogen gas that can not replace at least about 80% of the petroleum fuel needed by the automotive engine; 2) the products of combustion still contain appreciable amounts of pollutants due to the higher proportion of petroleum base fuel present; e.g., (CO 0.7%; NO 2 8.9%; unburnt hydrocarbon fuel 13.8%). The large amount of unburnt hydrocarbon fuel not only increases pollution, but is actually energy lost in the combustion process; 3) the process involves relatively high concentration of sodium hydroxide (30% NaOH), which is prohibitively expensive when compared to the cost of pure gasoline or diesel fuel. All these schemes of hydrogen generation share two serious problems: 1) the generator is not designed to operate a continuous feed system necessary to increase output or production of hydrogen from the cell; 2) the hydrogen generator is not designed to operate at high current densities in order to produce sufficient hydrogen to replace at least about 80% of the hydrocarbon fuel used by automotive and other engines.

Another invention (U.S. Pat. No. 4,609,120) dealt with photoelectrolytic production of hydrogen only on a very limited scale, but this method is not commercially viable and not applicable to automotive and other engines.

Still another invention (U.S. Pat. No. 4,099,489 by Bradley) deals with generation of hydrogen in small quantities to be combined with the hydrocarbon fuel whose prime purpose is reduction of pollution, but not to replace at least about 80% of the petroleum fuels used by automotive and other engines. This patent has several drawbacks and disadvantages, including the following: 1) the method utilizes expensive equipment such as turbine, high pressure pumps, water purifier, flow and pressure control instruments, D.C. and A.C. generators, condenser, etc., in addition to the costly high pressure electrolytic cell used; 2) the method employs two sets of generators and a rectifier unit which complicates transformation of energy from mechanical to electrical energy thereby greatly reducing overall efficiently; 3) the complex method and equipment used in producing a small quantity of hydrogen to replace an even small portion of hydrocarbon fuel required to run the engine with the object of simply reducing the pollutant emissions to a very small degree will result in a prohibitively high fuel cost; 4) the pollutant effect of the hydrocarbon fuel still present in the combustion process will remain unabated and will continue to be a problem; 5) no laboratory test on the emissions of the exhaust of an engine using Bradley's method have been conducted or reported.

Considering the drawbacks of Bradley's invention and other cited in the foregoing, the best alternative to conserve the energy resources of the United States and eliminate pollution is to replace a major portion (e.g. 81%) of the hydrocarbon fuel with relatively non-pollutant fuel such as hydrogen, which is the object of the present invention.

SUMMARY OF THE INVENTION

When percentage is expressed herein it refers to percent by volume. The present invention comprises utilizing an efficient hydrogen generator to convert water into hydrogen and oxygen in sufficiently large quantities capable of supplying (at steady state) a major percentage up to at least about 80% of the volume of fuel normally required by an automotive or other internal combustion engine by passing a high density direct current through water contained in an electrolytic cell or water fuel converter, in the range of 50 to 5,000 amperes, whereby the generated hydrogen is utilized simultaneously by the automotive or other engines, the hydrogen gas passing through a flash back preventer, and thence into a hydrogen gas collector tank, carburetor adapter and finally to the carburetor of the gasoline engine. For diesel and other fuel injection types of engines, the hydrogen gas is simply introduced into the respective fuel lines of these engines. For gas turbine engines, the hydrogen gas is introduced directly into the combustion chamber of the engine.

The drawbacks of the inventions mentioned in the preceding Description of the Prior Act (U.S. Pat. No. 4,763,610 and others) are solved or overcome in the present invention by incorporating the following features: 1) the electrolytic cell or cells in the present invention are designed for a continuous feed system which enables the cells to maintain the anodic level necessary for safe operation even at high amperage loads or high current densities in the range of 50 to 50,000 amperes; 2) the direct current supply used is in the range of 50 to 5,000 amperes, which amperage is capable of generating sufficient hydrogen gas fuel which can supply (at steady state), a majority up to at least about 80% of the total liquid volume fuel needs of automotive and other engines.

One object and advantage of this invention is that the emissions resulting from the combustion of hydrogen are relatively non-pollutant, thereby greatly reducing CO and unburned hydrocarbons by as much as 65%. Still another advantage of internally generated hydrogen as a primary source of fuel and recycling the generated oxygen is the reduction of undesirable nitrogen pollutants due to the decreased consumption of air as an oxygen source.

A feed pump continuously supplies water into the electrolytic cell, passing through a feed tank and a constant level and flow control device to maintain anodic level inside anodic chamber while excess water flows back to the sump tank by way of outlets at the bottom of the cathodic chambers.

The electrolytic cell is designed as a compact unit, comprising a rectangular body or frame made of material such as bakelite, a graphite carbon anode perforated and grooved for fast and easy circulation of anolyte water inside the anodic compartment; a perforated steel cathode with back up compartment to hold the hydrogen gas and cathodic liquid; a set of asbestos diaphragms to separate the anodic from the cathodic compartments placed at both sides of the frame fitted with gaskets at both sides to form a tightly sealed inner and outer compartment which are bolted together with the cathodic plates in place.

The graphite carbon anode is fitted loosely into the frame so that water can continuously enter the anodic compartment of the cell; the mild steel comprising the cathodic chambers has holes at the bottom for excess water to pass through the sump tank, while holes at the top of the cathodic chambers serve as exit for the hydrogen gas to pass through continuously into the flash back preventer, thence to the hydrogen gas collector tank and finally into the carburetor through the carburetor adapter of the carburetor type of engine and gas turbine engines by way of the two-way fuel selection valve and Y-connection element of the routing device. Similarly, the generated oxygen can be recycled to reduce the quantity of air needed for combustion (at steady state). By "steady state" is meant the operation of the engine combustion after start-up and sufficient operation to achieve generation of sufficient hydrogen to replace at least about 81% of the volume of gasoline normally used at that point in the operation of the engine. Although there is a consumption of energy in converting gasoline to electricity, and water to hydrogen, the advantages of the invention overcome this loss by an overall more efficient combustion.

The water fuel converter includes an electrical power source or supply such as a direct current generator of 50–5,000 amperes direct current output rating run by the automotive engine connected by means of a rotational energy connecting element.

This invention operates initially during start-up on a dual feed system whereby the carburetor adapter is fitted side-by-side with the carburetor of a gasoline engine to convert the engine from gasoline (liquid) feed to hydrogen gas (gas) feed by means of a two-way fuel selection valve and Y-connection element. In such manner, the gasoline fuel can be decreased or even shut off simultaneously and hydrogen gas introduced without stopping the engine. For diesel, gas turbine and other fuel injection type of engines, no carburetor adapter is required because the hydrogen gas is simply introduced into the fuel lines of these engines by means of the two-way fuel selection valve and Y-connection element with appropriate means to present the hydrogen gas (and, if desired, the oxygen) into their respective combustion chambers.

At the initial start-up, the engine is run first with the gasoline fuel available, but as soon as sufficient amount of hydrogen gas is stored in the hydrogen gas collector tank, the gasoline fuel gradually is closed to a point where only 19% of the gasoline fuel is left in admixture with 81% of the gasoline fuel originally used before introduction of hydrogen gas, while simultaneously opening the hydrogen gas fuel into the combustion chamber of the engine. For an LPG gas fuel operated engine in use, the automatic switching mechanism with the two-way fuel selection valve and Y-connection element is simply used to change from the throttle and adjust the LPG gas valve which is mixed with the hydrogen gas fuel generated from the cells at any point along the fuel line.

For subsequent start ups, the hydrogen gas stored in the hydrogen gas collector tank could be able to run the engine easily with the minimal supplement of gasoline (i.e. 19%) diesel fuel, or LPG gas. In the automobile, the water sump tank is simply installed beside the gasoline tank, while the electrolytic cell is installed as a compact unit in the back compartment of the car.

In operation, water is first treated with an alkali to obtain a pH range of 7.1–14. The water, thus activated, is fed continuously into the electrolytic cell from a feed tank through a constant level flow control device, the feed tank being supplied continuously with activated water from the sump tank by means of a 6–12 volts D.C. electric pump. High density direct current in the order of 50–5,000 amperes is then supplied to the electrolytic cell through the respective anode and cathode connections with current density adjusted by means of a variable power supply control device to provide the amperage loads required for a particular automotive engine model and horsepower. The hydrogen gas generated from the cell is utilized simultaneously by the automotive engine passing through the exit tube, flash back preventer, then to the hydrogen gas collector tank, two-way fuel selection valve, Y-connection element, carburetor adapter, and finally to the carburetor of the automotive engine; e.g., with minimal supplement of gasoline, diesel, or LPG gas. The oxygen, liberated and separated at the anodic compartment, is pumped by a D.C. electric pump to the carburetor of the engine or, less desirably, simply vented into the atmosphere. Check valves before and after the pump provide safety measures to prevent back flushing.

DETAILED DESCRIPTION OF THE PREFERRED EMBODIMENTS

Figure 2:
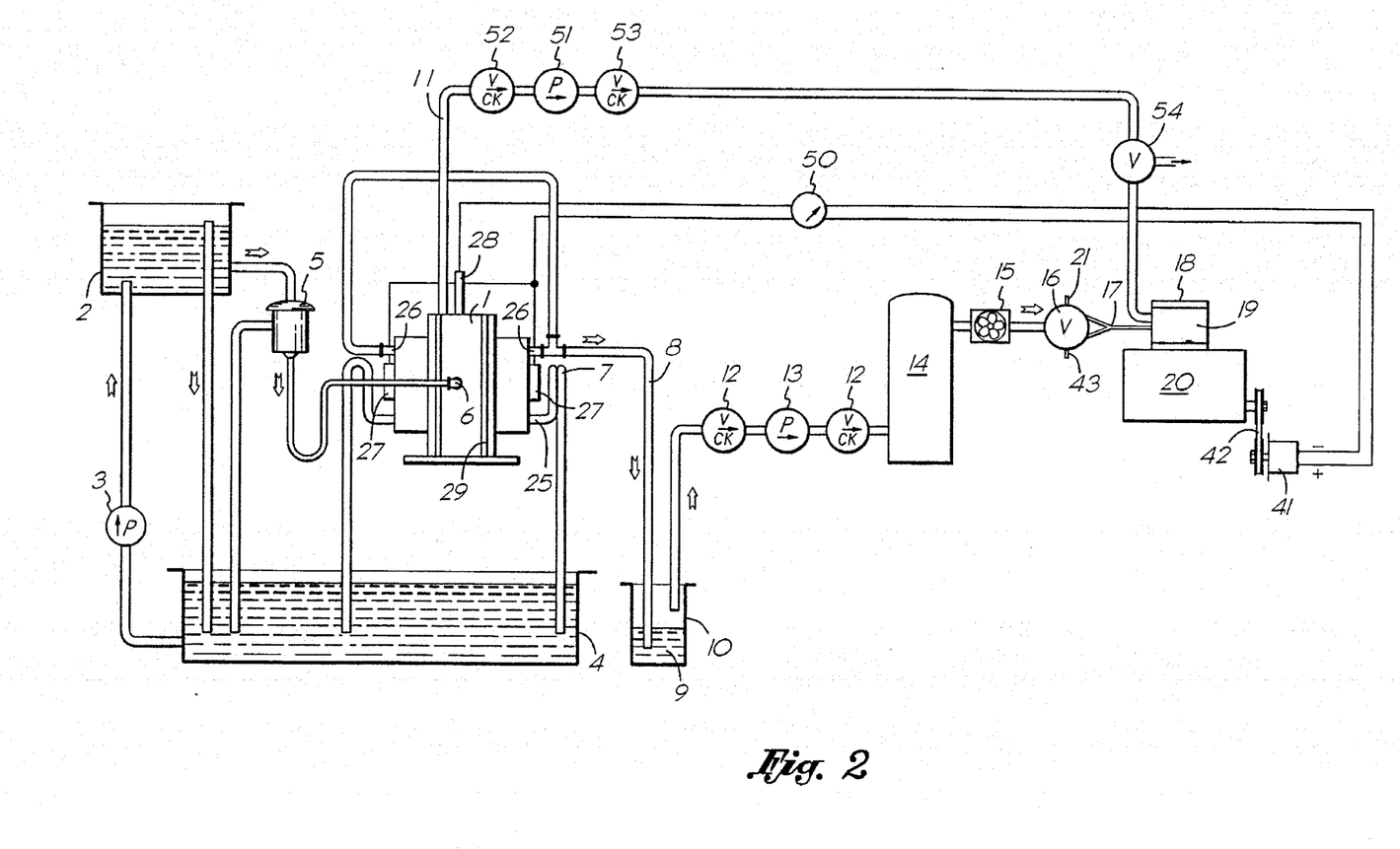
FIG. 2 is a Schematic Diagram showing the complete set-up of the device for generating hydrogen from water and presenting the hydrogen gas to the engine.

Reference FIG. 2, (1) is the Electrolytic cell which generates hydrogen from water as water is fed continuously from a feed tank (2) maintained at constant head by a feed pump (3) while excess water flows back to the sump tank (4). Water is fed continuously to the Electrolytic cell (1) through a constant level flow control device (5) by way of the inlet hole (6). Excess water flows back to the sump tank (4) through discharge holes (5) of the cathodic liquid level control device (7).

The Electrolytic cell is energized by a direct current (d.c.) generator (41) of 50–5,000 amperes d.c. current output, run by the automotive engine (20) by means of a rotational energy connecting element (42). The positive terminal of the d.c. generator (41) is connected to the bus bar (28) of the graphite carbon anode (32) while the negative terminal is connected to the negative (27) of the cathodic plate.

As current is supplied to the electrolytic cell (1), water inside the cell is immediately decomposed into hydrogen and oxygen, the hydrogen gas passing through the hydrogen outlet (26) while the separated oxygen from the anodic chamber is discharged through the oxygen exit tube (11). The hydrogen gas from the hydrogen outlet (26) flows continuously through conduit (8) leading to the flash back preventer (10) containing water (9) maintained at a predetermined level, then through check valves (12) and (12) and finally into the hydrogen gas collector tank (14). Pressure inside the anodic chamber of the electrolytic cell (1) and pressure at the hydrogen gas collector tank (14) are maintained at a certain point by means of the 6–12 volts d.c. electric pump (13). Hydrogen from the hydrogen gas collector tank (14) is introduced into the engine by means of the pump (15), the hydrogen gas passing through the two-way fuel selection valve (16) connected with Y-connecting element (17) and thence through the carburetor adapter (18) to the carburetor (19) and finally to the combustion chamber of the automotive engine (20) inlet (21) for gasoline fuel and inlet (43) for LPG gas fuel are provided in the fuel selection valve (16) to enable presenting to hydrogen gas simultaneously while maintaining the desired or requisite proportions; e.g., about 19% of the volume of gasoline feed with the remainder of fuel being hydrogen gas, the energy equivalent of LPG gas feed and the remainder hydrogen.

Figure 3:
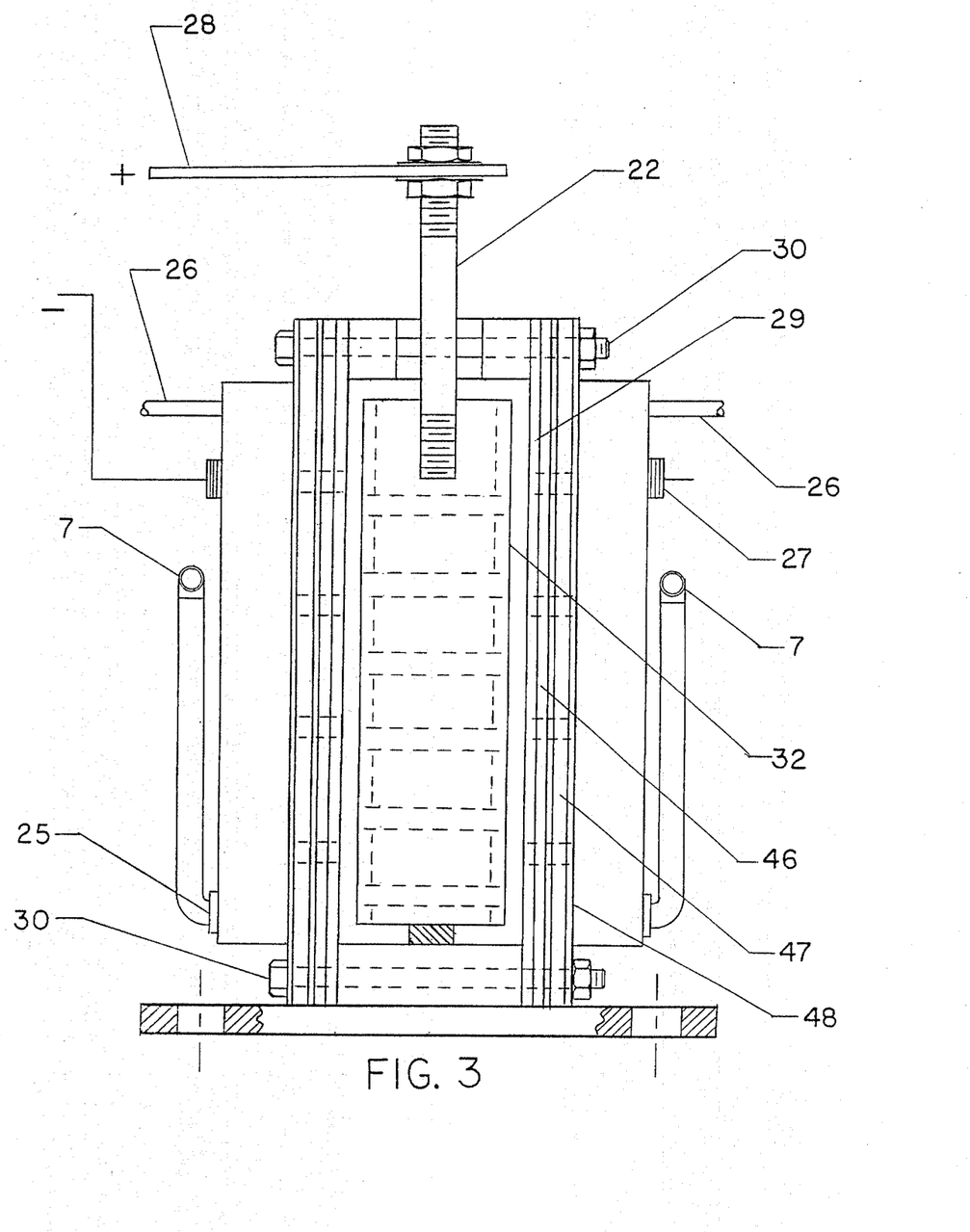
FIG. 3 is a cross-sectional view of the Electrolytic cell showing the position of the graphite carbon anode in the anodic chamber, connection of the positive terminal to the graphite carbon anode, and arrangement of the diaphragms and gaskets with respect to the two cathodic chambers.
Figure 4:
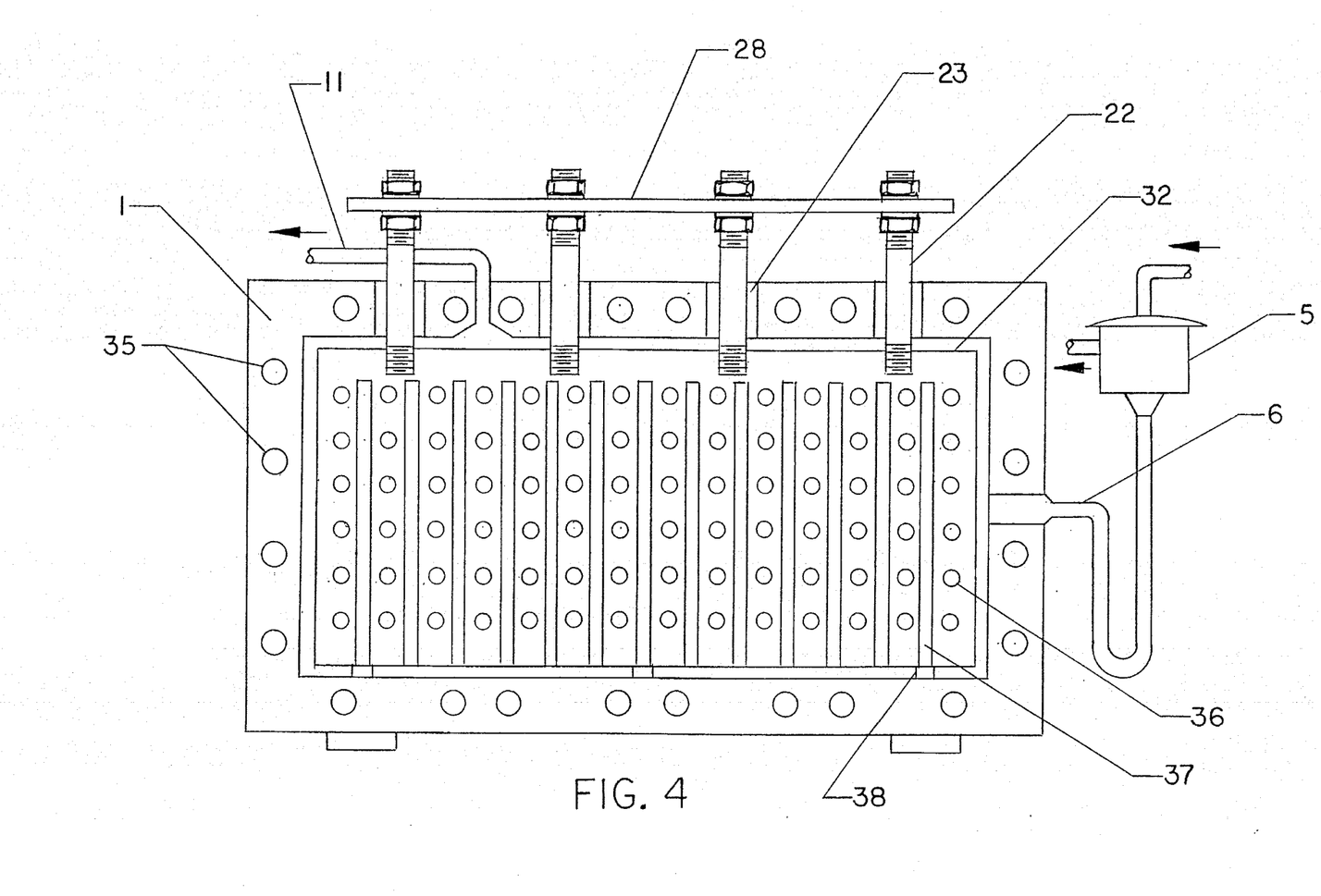
FIG. 4 is a longitudinal section of the Electrolytic cell showing the respective positions of the copper rods connection the graphite carbon anode and the position of the constant level control device.
Figure 5:
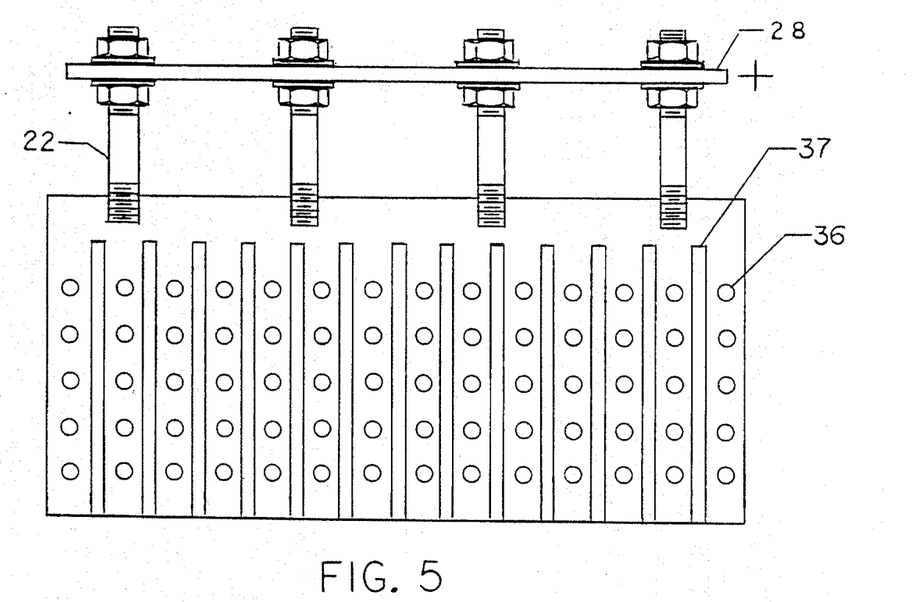
FIG. 5 is a longitudinal section of the graphite carbon anode with perforations and grooves shown in detail.

The anode (32), FIGS. 3 and 4, is made of graphite carbon, perforated (36) and grooved (37) to allow free circulation of activated water from the bottom to the top of the anodic chamber by natural convection currents resulting in a rapid dissipation of heat in the system. The location of the inlet feed (6) also facilitates the rise of heated water thereby providing a fresh supply of water in the system which is readily decomposed by the flow of the high density direct current through it.

Figure 8:
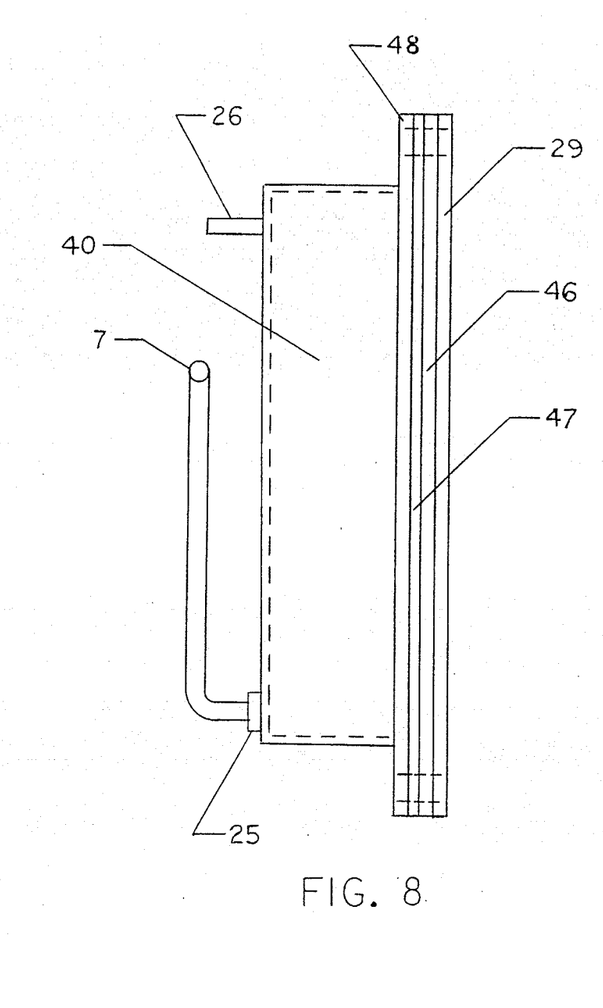
FIG. 8 is a detailed cross-section of the cathodic chamber showing arrangement of the diaphragms, gaskets, and cathodic liquid discharge pipe.

The frame of the electrolytic cell (1), (FIG. 4), is provided with bolt holes (35) around the periphery of the frame to allow stud bolts at both sides of the frame, firmly anchoring the asbestos diaphragms (46), (FIG. 8). The graphite carbon anode (32), (FIG. 4) is supported by porcelain supports (38) to avoid grounding or short-circuiting of the cell and is connected to the outside positive terminal circuit of the d.c. generator (41) by means of copper rods (22) threaded at both ends, one end of which is screwed tightly to the graphite carbon anode (32) spaced at convenient intervals along the axis while the external ends of the copper rods (32) are attached to the copper bus bar (28) which is electrically connected to the d.c. generator (41) which is driven by the automotive engine (20) by means of the rotational energy connecting element (42).

Figure 6:
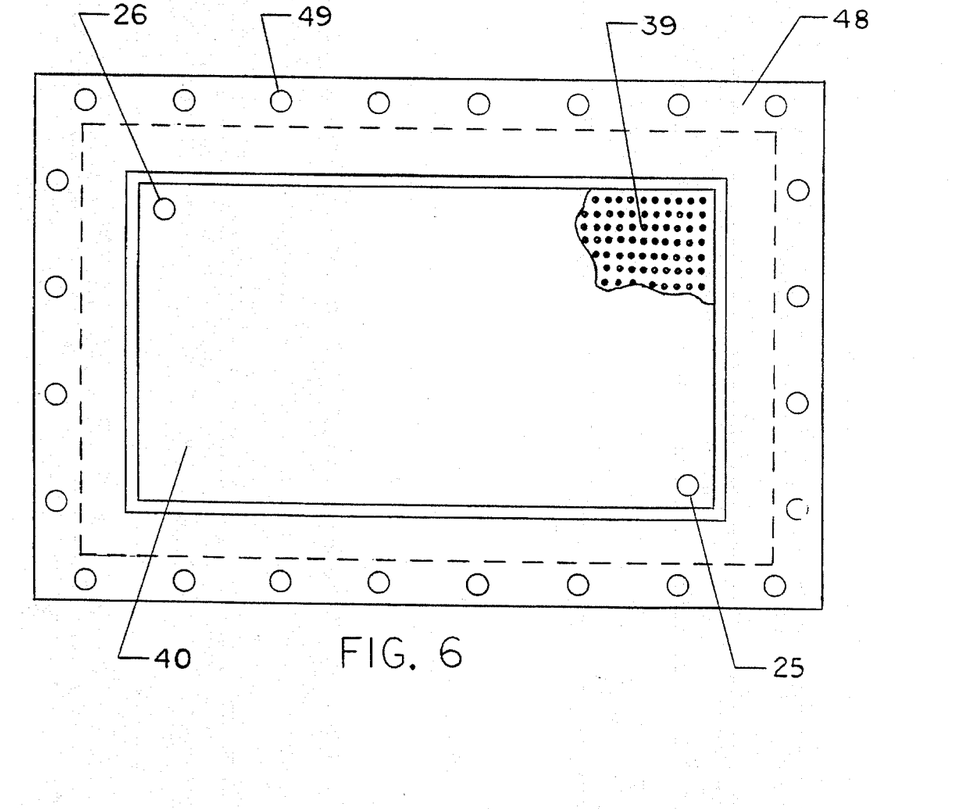
FIG. 6 is a front view of the cathodic plate and chamber, with cut-away view showing the perforations of the inner plate.
Figure 7:
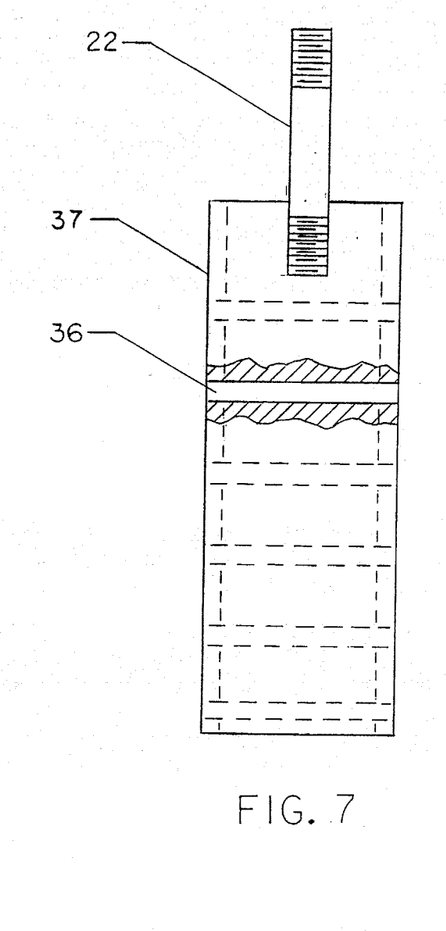
FIG. 7 is a detailed cross-section of the graphite carbon anode.

The cathodic steel plate (40), (FIG. 6) is shown with perforations (39) in the cut-away view. A clamp (48) is fitted snugly around the rectangular body of the cathodic chamber, with bolt holes (49) for the bolts to pass and hold firmly the gaskets (29), asbestos diaphragms (46) and cathodic plates (47), (FIG. 8).

Figure 1:
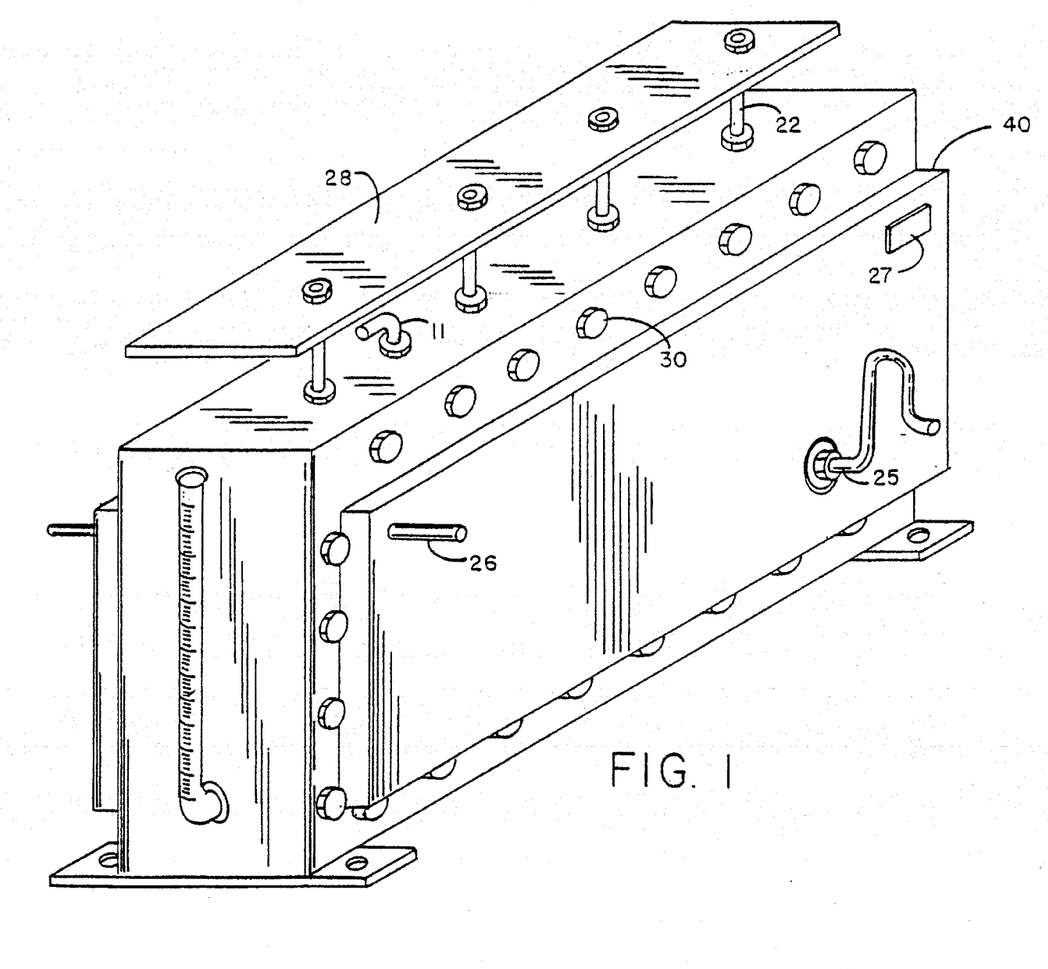
FIG. 1 is a Perspective of the Water Fuel Converter.

The negative terminal (27) of the cathode (FIG. 1) is connected electrically to the negative terminal of the d.c. generator (41). Means to adjust and regulate the power load to the electrolytic cell with a variable power supply control device (50). (FIG. 2) are connected between the electrolytic cell (1) and the d.c. generator (41) enabling the cell to operate at varying amperage loads adaptable to each particular engine model and horsepower rating in order to generate the requisite amount of hydrogen gas which is added to (as by mixing) with the gasoline, diesel fuel, or LPG gas required to operate such engine.

The oxygen gas coming from the exit tube (11) is pumped by means of a pump (51) provided with check valves (52) and (53) to maintain pressure inside anodic chamber which is presented to the carburetor (18) or simply vented into the atmosphere by means of the two-way valve (54).

Although the description above contains many specificities, these should not be construed as limiting the scope of the invention but as merely providing illustrations of some of the presently preferred embodiments of this invention. For example, the d.c. generator may vary over the range of 50–5,000 amperes. The anode could be fabricated from nickel or appropriate metallic element, and the diaphragms could be any other acid-alkali resistant filtering material. The hydrogen gas an be routed by an electric blower, and fuel injection nozzles could replace the carburetor. The cathodic steel plate could be fabricated from stainless steel or other appropriate metallic element.

EXAMPLE

A Wisconsin engine was started with gasoline fuel to drive a direct current generator feeding electrical power to electrolytic cells. While the engine was running on pure gasoline fuel, the hydrogen generated from the cells was vented to the atmosphere and the rate of gasoline consumption was determined. Then the hydrogen was introduced into the engine by way of a T-connection, and through a valve, and gradually closing the gasoline fuel petcock valve to a point where the engine could continue running with the gasoline and hydrogen fuel mixture. Attempts were made to completely close or shut off the gasoline fuel and run the engine with 100% hydrogen fuel, but the engine stopped. The engine was made to run with the minimal mixture of gasoline combined with the total volume of hydrogen generated from the electrolytic cells, and the engine was made to run with this combined gasoline and hydrogen fuel mixture for a period of 12 minutes. The rate of flow of gasoline fuel used to supplement the hydrogen fuel to keep the engine running normally was also measured.

In the hydrogen run, 81 volume percent less gasoline was used at steady state. The "gasoline only" test was run under a "no load" condition while the "gas/H2 mixture" test was run under a "load" condition. This was because the "load" was the actual charging of the electrolytic cells, and a "gasoline only" condition required no charging of electrolytic cells.

Analysis of the exhaust gases showed, in volume percent, with gasoline only 8.84% CO, 0.87% total hydrocarbons, and NOx of 44.1 ppmv. The hydrogen and gasoline rune showed 3.20% CO, 0.36% total hydrocarbons, and 283.0 ppmv NOx. The NOx can be greatly lowered in the present invention by recycling the generated oxygen to the engine.

The scope of this invention should be determined by the appended claims and their legal equivalents, rather than by the examples given.

I claim:

1. An apparatus for converting water into fuel for automotive or other combustion engine comprising:

means, within an electrolyte cell, for converting water into hydrogen gas and oxygen gas;

means for routing the hydrogen gas to the engine;

means for generating a high density direct current source to power the converting means whereby said hydrogen gas will serve as the major fuel source to replace, at steady state, a majority of the volume of gasoline normally used by said engine;

and wherein said electrolytic cell is composed of a water-tight frame, a positively charged graphite carbon anode, said anode being perforated and grooved, a negatively charged perforated steel cathode, whereby the flow of electrolyte through the cell is facilitated, and asbestos diaphragms as means for separating the anodic from the cathodic compartments.

2. The apparatus of claim 1, in which the means for routing the hydrogen gas to the engine comprises a flash back preventer, a hydrogen gas collector tank, a two-way fuel selection valve, a Y-connecting element, and a carburetor adapter whereby the engine may be run, at steady state, on hydrogen and less than 50% of the volume of the gasoline normally required to power said engine.

3. The apparatus of claim 1, in which the means for generating a current source to power the converting means comprises a direct current output in the range of 50 –5,000 amperes.

4. The apparatus of claim 1, where the current generating means, further comprises a positive output which is connected to the anode of the electrolytic cell, and a negative output which is connected to the cathode of the electrolytic cell, whereby the converting means is accomplished.

* * * * *